US010776378B2

(12) United States Patent
Shivarudraiah et al.

(10) Patent No.: US 10,776,378 B2
(45) Date of Patent: Sep. 15, 2020

(54) SYSTEM AND METHOD FOR USE OF IMMUTABLE ACCESSORS WITH DYNAMIC BYTE ARRAYS

(71) Applicant: ORACLE INTERNATIONAL CORPORATION, Redwood Shores, CA (US)

(72) Inventors: Ashok Shivarudraiah, Fremont, CA (US); Douglas Surber, Orinda, CA (US); Jean De Lavarene, Menlo Park, CA (US)

(73) Assignee: ORACLE INTERNTIONAL CORPORATION, Redwood Shores, CA (US)

( * ) Notice: Subject to any disclaimer, the term of this patent is extended or adjusted under 35 U.S.C. 154(b) by 602 days.

(21) Appl. No.: 14/794,642

(22) Filed: Jul. 8, 2015

(65) Prior Publication Data
US 2016/0012155 A1 Jan. 14, 2016

Related U.S. Application Data

(60) Provisional application No. 62/022,584, filed on Jul. 9, 2014.

(51) Int. Cl.
*G06F 16/25* (2019.01)
(52) U.S. Cl.
CPC .................. *G06F 16/252* (2019.01)
(58) Field of Classification Search
None
See application file for complete search history.

(56) References Cited

U.S. PATENT DOCUMENTS

| 4,698,749 | A | 10/1987 | Bhadriraju |
| 6,018,794 | A | 1/2000 | Kilpatrick |
| 8,285,758 | B1 | 10/2012 | Bono |
| 2003/0084374 | A1 | 5/2003 | Chatterjee |
| 2003/0130909 | A1 | 7/2003 | Caci |

(Continued)

OTHER PUBLICATIONS

Hale J., Threet J., Shenoi S. (1998) "Capability-based primitives for access control in object-oriented systems." In: Lin T.Y., Qian S. (eds) Database Security XI. IFIP Advances in Information and Communication Technology. Springer, Boston, MA. pp. 134-148.*

*Primary Examiner* — Tony Mahmoudi
*Assistant Examiner* — Umar Mian
(74) *Attorney, Agent, or Firm* — Tucker Ellis LLP (57) ABSTRACT

In accordance with an embodiment, described herein is a system and method for use of immutable accessors with dynamic byte arrays. In accordance with an embodiment, a database driver provides access by software applications executing at an application server to data at a database, including associating a result set cache manager with a pool of result set caches. Each result set cache can be associated with one or more immutable accessors. In response to receiving a request from an application, to access a set of data, the set of data from the database is received into a particular result set cache. In response to receiving a subsequent request for a same set of data, from a same or another application using a same or another database connection, access is provided to the immutable accessor associated with the particular result set cache, for use in accessing the data therein.

19 Claims, 6 Drawing Sheets

(56) References Cited

U.S. PATENT DOCUMENTS

| | | |
|---|---|---|
| 2006/0047855 A1* | 3/2006 | Gurevich .............. G06F 16/182 |
| | | 709/247 |
| 2007/0050349 A1* | 3/2007 | Schreter ............ G06F 17/30575 |
| 2009/0063781 A1* | 3/2009 | Ebersole ............. G06F 12/0875 |
| | | 711/141 |
| 2009/0282369 A1 | 11/2009 | Jones |
| 2014/0092678 A1 | 4/2014 | Feekes |
| 2014/0143519 A1 | 5/2014 | Heidelberger |
| 2014/0281258 A1 | 9/2014 | Callaway |
| 2015/0067658 A1* | 3/2015 | Hahnenberg ........ G06F 12/0815 |
| | | 717/148 |
| 2015/0127623 A1 | 5/2015 | Gracie |
| 2015/0269179 A1 | 9/2015 | McClements |
| 2016/0012155 A1 | 1/2016 | Shivarudraiah |
| 2016/0077761 A1 | 3/2016 | Stabrawa |
| 2016/0092365 A1 | 3/2016 | Shivarudraiah |

\* cited by examiner

SYSTEM AND METHOD FOR USE OF IMMUTABLE ACCESSORS WITH DYNAMIC BYTE ARRAYS

CLAIM OF PRIORITY

This application claims the benefit of priority to U.S. Provisional Patent Application titled "SYSTEM AND METHOD FOR USE OF IMMUTABLE ACCESSORS WITH DYNAMIC BYTE ARRAYS", Application No. 62/022,584, filed Jul. 9, 2014, which is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application servers and databases, and are particularly related to a system and method for use of immutable accessors with dynamic byte arrays.

BACKGROUND

In an application server or database environment that enables access by software applications to data stored at a database, the data retrieved from the database can be allocated in a memory array or buffer. The data can then be accessed by the requesting application. In some instances, the data sets retrieved can be very large. Additionally, multiple applications may be interested in requesting the same sets of data, which can lead to duplication of fetching efforts, and performance implications. These are examples of the types of environments in which embodiments of the invention can be used.

SUMMARY

In accordance with an embodiment, described herein is a system and method for use of immutable accessors with dynamic byte arrays, for use in retrieving and accessing data stored at a database. In accordance with an embodiment, a database driver component and dynamic byte array provides access by software applications executing at an application server to data at a database, including associating a result set cache manager with a pool of result set caches. Each result set cache can be associated with one or more immutable accessors. In response to receiving a request from an application, to access a set of data, the set of data from the database is received into a particular result set cache. In response to receiving a subsequent request for a same set of data, from a same or another application using a same or another database connection, access is provided to the immutable accessor associated with the particular result set cache, for use in accessing the data therein.

DETAILED DESCRIPTION

As described above, in an application server or database environment that enables access by software applications to data stored at a database (for example, through the use of a database query or select statement), the data retrieved from the database can be allocated in a memory array or buffer (for example, as a ResultSet), where it can then be accessed by the requesting application.

However, in some instances, the data sets retrieved can be very large. Additionally, multiple applications may be interested in requesting the same sets of data, which can lead to duplication of fetched data, and performance implications. For example, in some environments, applications can request connections, via a connection pool and a database driver, to make select requests or statements (e.g., SQL SELECT Statements) against a database. Instead of making several roundtrips to the database for a same set of data, the system can receive a set of data from the database into a result set or cache (e.g., a ResultSet Cache), where it can be re-used by the application as appropriate. Data which is cached as a result set can be updated as its corresponding data is updated in the database, or can be otherwise aged-out or invalidated.

Particular challenges can arise when caching database columnar data. In some environments, the system can cache data and metadata together, and can provide an accessor for use in accessing a result set, for example by providing an array and offset into a datastream to access the data at a certain column in a certain row.

In such environments, the operation of the accessor can be controlled by the select request or statement to move to a certain point within the datastream. However, typically each accessor is tightly coupled with a particular statement or connection, so that the data is localized to that connection, and cannot be shared across multiple statements or connections.

In accordance with an embodiment, described herein is a system and method for use of immutable accessors with dynamic byte arrays, for use in retrieving and accessing data stored at a database.

In accordance with an embodiment, a database driver component and dynamic byte array provides access by software applications executing at an application server to data at a database, including associating a result set cache manager with a pool of result set caches. Each result set cache can be associated with one or more immutable accessors from one or more connections. In response to receiving a request from an application, to access a set of data, the set of data from the database is received into a particular result set cache. In response to receiving a subsequent request for a same set of data, from a same or another application using a same or another database connection, access is provided to the immutable accessor associated with the particular result set cache, for use in accessing the data therein.

In accordance with an embodiment, a columnar accessor contains database metadata and column location handler, which can be tightly integrated with a database driver, for example a JDBC driver, and its components, for example Statement and ResultSet functions.

In accordance with an embodiment, an immutable accessor is a read-only data accessor that generally does not allow modification, but is instead read-only in nature. An immutable accessor can be used in accessing cached data received from a database in response to requests, including those associated with multiple requests. For example, in accordance with an embodiment, a particular immutable accessor can be used across multiple Statements and ResultSets concurrently. Each accessor can be associated with a read-only copy of the metadata plus a pointer to the data.

In accordance with an embodiment, a result set cache (e.g., a ResultSet Cache), can be used to cache fetched results on the client side, for example at the application server together with the applications running thereon. A database driver can then use the immutable accessor to access the data stored at the database. In accordance with an embodiment, an accessor prototype (e.g., AccessorPrototype) can be used to create shared, read-only accessors across statements.

Figure 1:
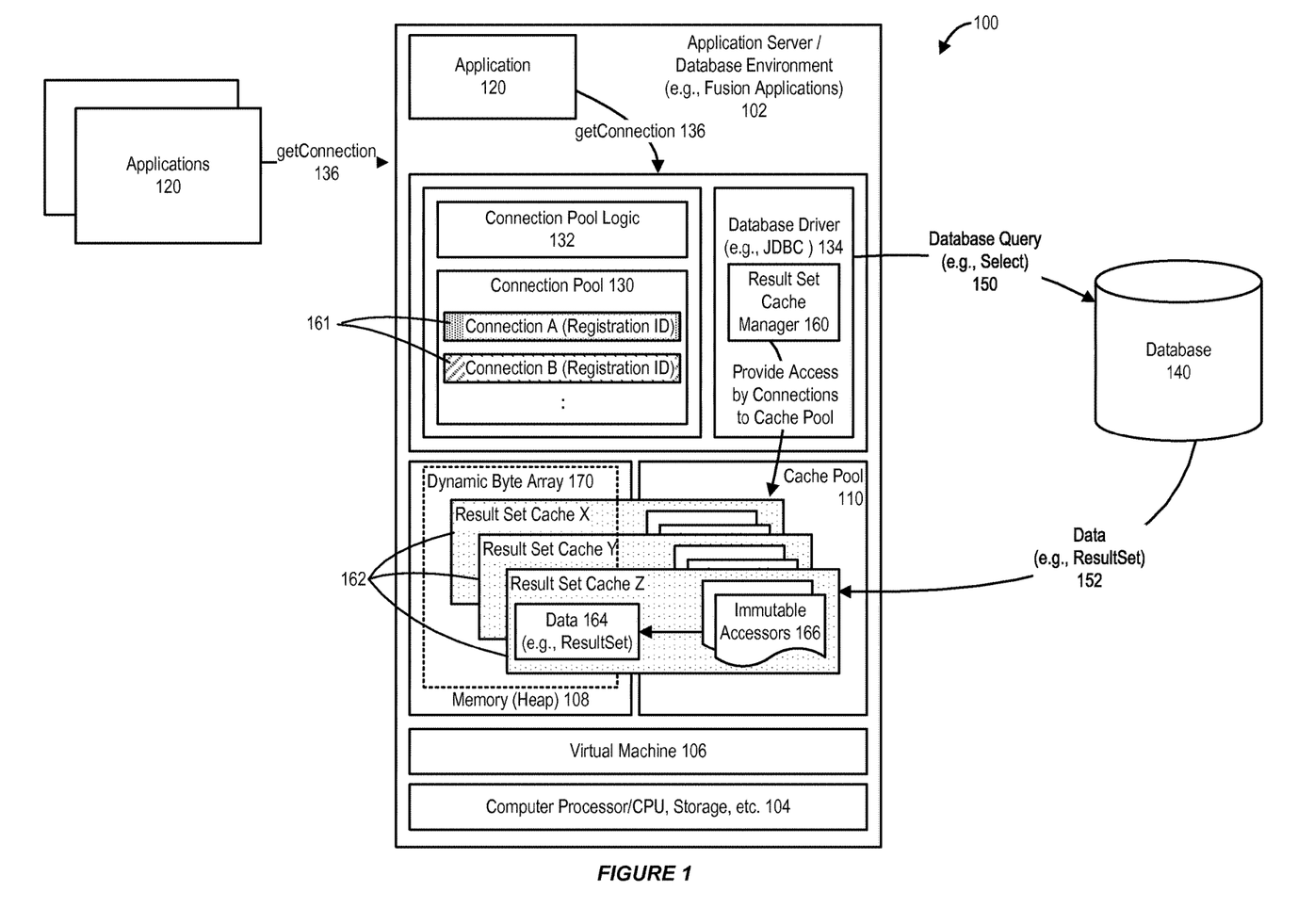
FIG. 1 illustrates a system for use of immutable accessors with dynamic byte arrays, in accordance with an embodiment.

FIG. 1 illustrates a system 100 for use of immutable accessors with dynamic byte arrays, in accordance with an embodiment. The system 100 may be a clustered computing system, such as a clustered database server comprising multiple database server instances executing on multiple host nodes to access and manipulate shared data stored on a data storage mechanism, for example. The example operating environment of FIG. 1 is illustrated and described in the context of a clustered database server for purposes of discussion, however, it is contemplated that any distributed database server or distributed computing system could benefit from use of the broader techniques enabled herein. Therefore, embodiments of the invention are not limited to use with a clustered database system.

As shown in FIG. 1, by way of example, the system 100 can include an application server or database environment (e.g., an Oracle Fusion Applications environment) 102; a physical computer processor/CPU and storage 104; a virtual machine (e.g., a Java virtual machine) 106; and a memory/heap 108, which includes a cache pool 110. The application server 102 enables access by software applications 120, using one or more connection pools (e.g., Oracle UCP) 130 and associated connection pool logic 132, along with and a database driver (e.g., a Java Database Connectivity (JDBC) driver) 134, to provide access to, or to update data at a database 140.

Depending on the particular embodiment, requesting software applications can be provided internally within the application server 102 itself and located at the same computer, or alternatively can be provided at other locations and act as clients to the application server. The database can be similarly located at the same computer as the application server and/or its applications, or can be provided at other computers in communication via a network.

In accordance with an embodiment, the application server/database environment can also be provided within a cloud environment, and can enable access to the database by multi-user or multi-tenant cloud-based applications.

In accordance with another embodiment, one or more clients are communicatively coupled to the application server 102 through one or more applications 120 and connections 136. Application server 102 refers to database server instances (not shown) and nodes (not shown) on which the instances execute. Other components may also be considered as part of the application server 102, such as a connection pool logic 132 and one or more connection pools 130, for example. The actual architecture in which the foregoing components are configured may vary from implementation to implementation.

As further shown in FIG. 1, connection pool logic 132 controls the creation and use of objects in the one or more connection pools 130, including connections that are currently in use, and connections that are idle.

Applications 120 may initialize connections 136 retrieved from a connection pool 132 before using the connection. Examples of initialization include simple state re-initializations that require method calls within the application code, or more complex initializations including database operations that require round trips over a network. The cost of these latter types of initialization may be significant.

Some connection pools, such as the Oracle Universal Connection Pool (UCP), allow their connection pools to be configured using connection pool properties. The properties have get and set methods that are available through a pool-enabled data source instance. These methods are a convenient way to programmatically configure a pool. If no pool properties are set, then a connection pool uses default property values.

The process of creating a connection tasks resources, especially where a large number of clients are accessing the database in short, unconnected operations.

Connection pool 130 operates by performing the work of creating connections ahead of time. For example, a pool of connection objects may be created at the time the application server (or some other server) starts. These objects are then managed by connection pool logic 132 that disperses connections as they are requested by clients and returns them to the pool when it determines the client is finished with the connection object. For example, the connection pool 130 may include a plurality of connection pools that facilitate connections based on the type of data requested (e.g., a particular service) by the client.

In accordance with an embodiment, software applications 120 can use a connection 136 to make requests, such as a database query (e.g., a select) 150, that is communicated to the database 140. In response, data is returned (e.g., as a ResultSet 152) to the application server environment, and is stored in memory (heap) as a result set cache 162 (e.g., ResultSet Cache X, Y, Z) that includes corresponding data 164 (e.g., data returned in the ResultSet) and immutable accessors 166, which were populated as a result data returned in the ResultSet. The result set cache 162 may include one or more identifiers that may be used for the result set cache manager 160 to access one or more particular result set cache (e.g., ResultSet Cache, X, Y, Z). One such identifier may be a registration identification, which is associated with the connection or statement used in obtaining the result set.

Generally, whenever an application makes a request to the database, the database driver (e.g., the JDBC driver) requests the virtual machine 106 to allocate sufficient space within the memory (heap) 108 to store the required data, so that it can be then used to satisfy the application's request. In some environments, a plurality of arrays or buffers, for example in this illustration a plurality of short, char, and/or byte arrays, can be allocated to store the required data returned from the database 140 by a database query. Each type of array stores a particular data type of the required data. As an illustrative example, the char array can store data from a database column that stores character data, such as last names. Each column in the database can be associated with a corresponding logical column in these arrays.

In conventional systems, an accessor may be used to store information responsive to a statement (e.g., a query). Columnar accessors are database metadata and column location handlers. Columnar accessors are tightly integrated with JDBC driver components such as Statement and ResultSet commands, for example. There are a variety of problems in using accessors in this manner. For example, data in a conventional accessor is localized to a single connection. Therefore, every time a query is run, a new accessor is created, which may require large amounts of memory to be used to store data, much of which may be previously stored in memory.

In accordance with an embodiment, an immutable accessor, which includes metadata and data from the database 140, can be provided to enable access to the data stored in the arrays. Metadata may be any information associated with the immutable accessor. For example, the metadata may include a connection or statement identifier (e.g., Registration Identification), column labels, data type, etc.

An object is considered immutable if its state cannot change after it is constructed. Immutable objects are particularly useful in concurrent applications. Since the immutable object cannot change state, they cannot be corrupted by thread interference or observed in an inconsistent state. Immutable objects have efficiencies over creating a new object. Such efficiencies include, for example, decreased overhead due to garbage collection, and the elimination of code needed to protect mutable objects from corruption. An immutable column accessor, also referred herein as an immutable accessor are accessors that cannot be modified and are read only in nature. Immutable accessors are used in caching. An immutable accessor may be used across multiple Statement/ResultSet commands concurrently or any time after creation.

As further shown in FIG. 1, in accordance with an embodiment, a result set cache manager 160 is provided, which manages a plurality of result set caches 162. Generally, a result set cache manager 160 can be associated with a set of connections 136. In accordance with an embodiment, the system 100 can use a registration ID 161 to determine the appropriate set, which a connection can obtain at the time of connection. As illustrated in FIG. 1, the result set cache 162 (e.g., ResultSet Cache X, Y, Z) includes a data portion 164 and an immutable accessor portion 166, as discussed above.

In accordance with an embodiment, the database driver 134 uses a dynamic byte array 170 to enable access by the application to data in the database 140, including determining a size of a required data to be stored in memory 108, and successively allocating and copying the required data into the dynamic byte array 140 as a succession of blocks. The data stored within the succession of blocks can then be accessed and provided to the application.

In accordance with an embodiment, the use of a dynamic byte array is particularly useful for storing and retrieving sparse, variable width, and fixed width, data in Java, and provides performance advantages when the data to be retrieved is large and/or when particular data is repeated.

Figure 2:
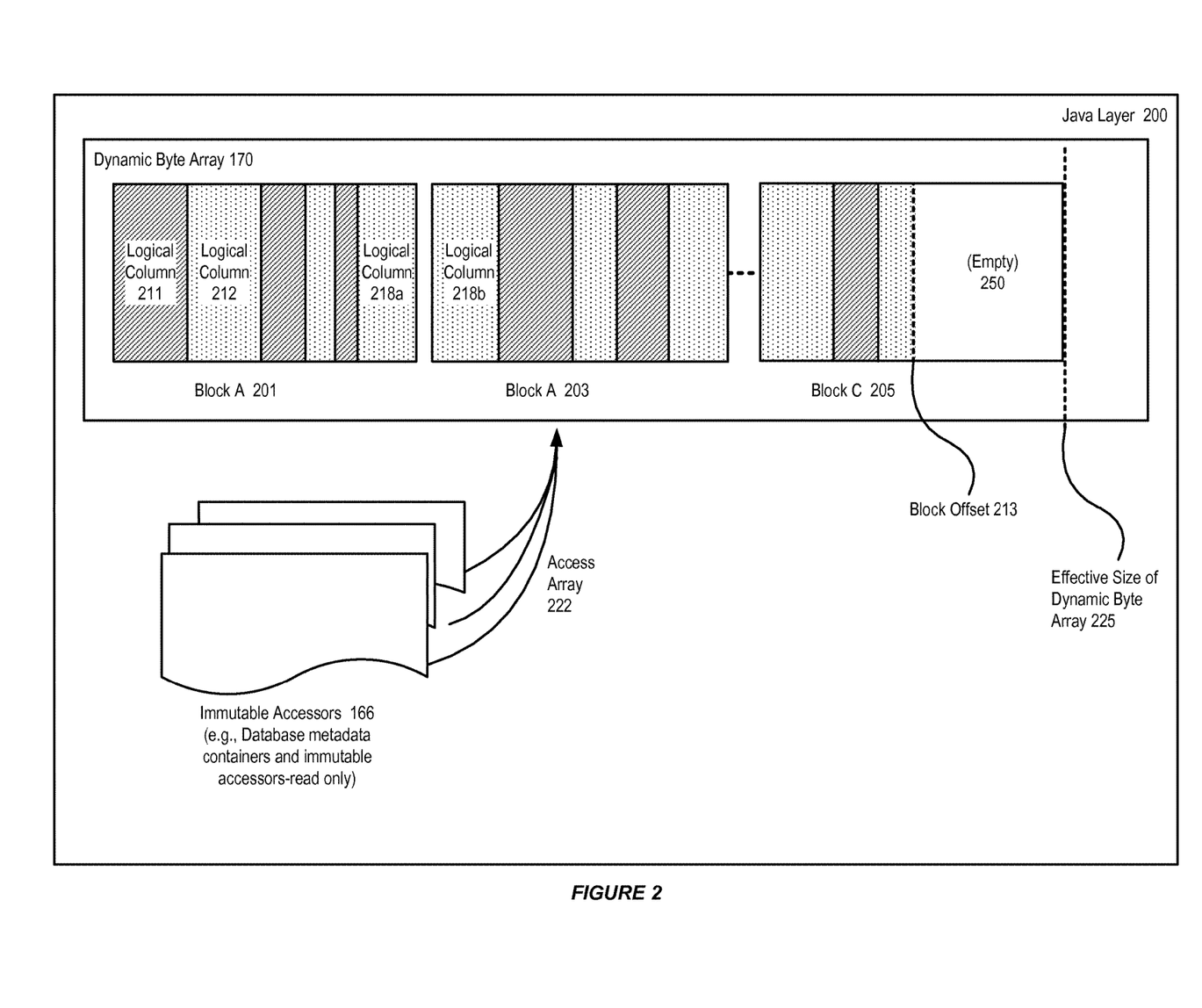
FIG. 2 illustrates storing of data as immutable accessors in a dynamic byte array, in accordance with an embodiment

FIG. 2 illustrates storing of data as immutable accessors 166 in a dynamic byte array 170. In accordance with an embodiment, when space is to be allocated in memory for a required data from the database, the system can ignore the maximum anticipated size (max_size) of the data expected to be received from the database, which is conventional, and instead determine the actual size of the required data, allocate a small block 201 in the Java Layer 200. In accordance with an embodiment this can be a 32k block from a buffer cache at first, and then dynamically allocate a succession of additional blocks 203 through 205 as necessary, to store the data. In accordance with an embodiment, offsets can be used to determine when to dynamically allocate additional blocks. In accordance with an embodiment, all the blocks allocated in the dynamic byte array 170 can be the same size.

In accordance with an embodiment, a block can include a plurality of logical columns, e.g., 211 and 212, and a logical column can spread across two different blocks. As an illustrative example, the block 201 does not have enough space to store the whole data of logical column 218. Part of the logical column 218a can be stored in the block 201, and the rest of the logical column 218b can continue in the block 203.

In accordance with an embodiment, a block offset 213 can be used to indicate the position of data in a block, and an effective size 225 of the dynamic byte array can also be provided to keep track of the size of the actual data that has been stored in the dynamic byte array. This approach results in minimal wastage of memory, e.g., empty space 250, smaller manageable chunks of data, the potential for storing unlimited data size with less risk of out-of-memory problems, and less virtual machine trashing during garbage collection. The technique also supports compression, in that a single copy of data can be stored for the same column data across multiple rows.

Accordingly, using the above example of an application that indicates a char[2000] array will be used for storage of last name data, in accordance with an embodiment, when the last name data is fetched from the database in response to a request, the system will first determine the actual size of the data, and then allocate only a sufficient number of (e.g., 32k) blocks to store the actual data, which results in less unused or empty space. For example, during a put operation, the system determines the size of required data to be stored in memory, and successively allocates and copies the required data into a dynamic byte array 170 as a succession of (e.g., 32k) blocks, including determining a last block and using block offsets to determine when to allocate new blocks for storage of the required data. In accordance with other embodiments, different and/or other steps can be used.

For example, during a get operation the system can use the block offsets to determine those blocks in which the data is stored as the succession of blocks, and provide the data to the requesting application. In accordance with other embodiments, different and/or other steps can be used.

Figure 3:
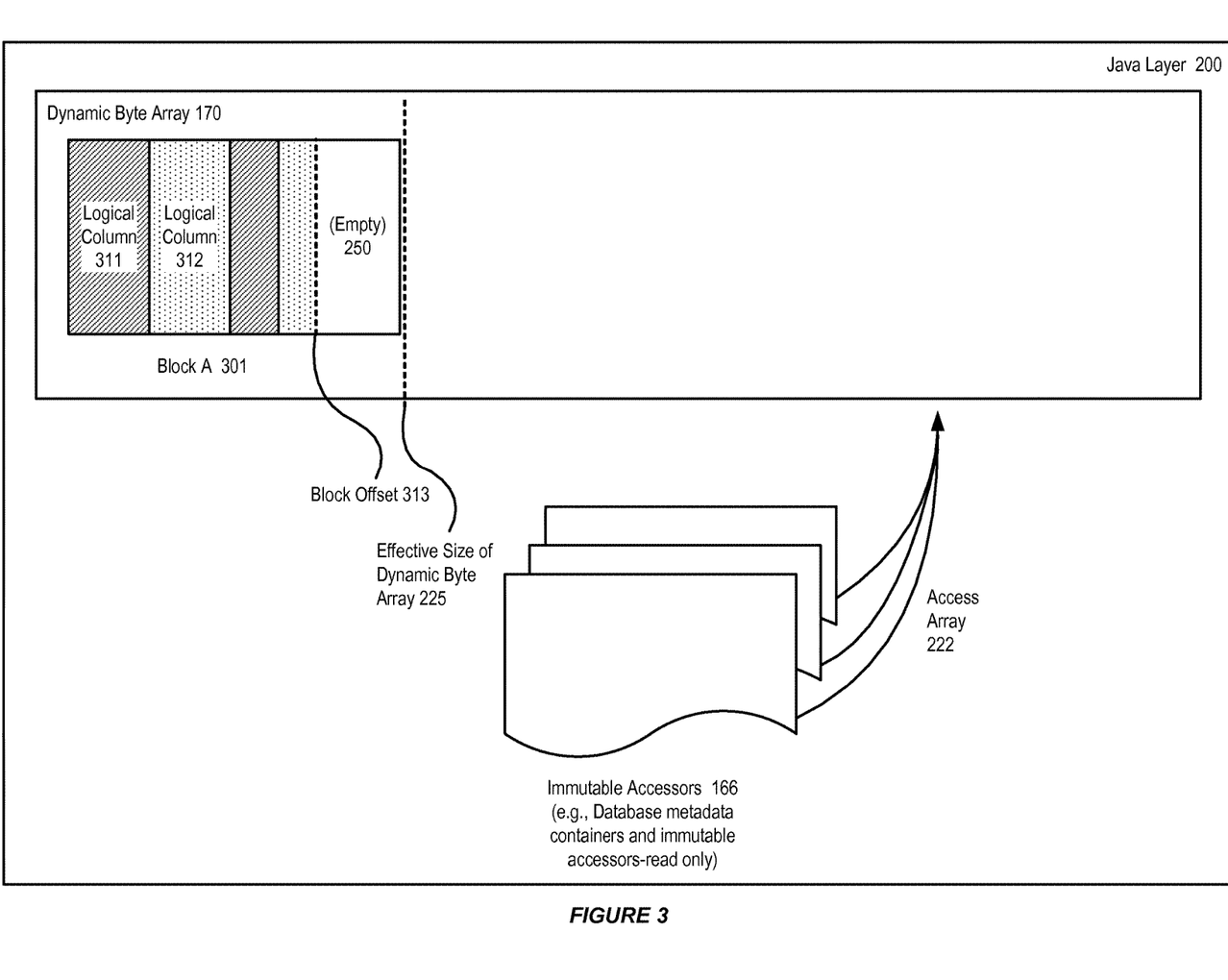
FIG. 3 illustrates storing of data using a dynamic byte array, in accordance with an alternative embodiment.

FIG. 3 illustrates storing of data using a dynamic byte array, in accordance with an alternative embodiment. In accordance with an embodiment, if the required data is small, e.g., smaller than a typical block size, then the system can allocate a single block of memory (e.g., 32k) 301 to store the required data.

In accordance with an embodiment, when the required data is first returned from a database query, the block offset 313, which specifies the position of a data stored in the block, can be initially set to zero. As shown in FIG. 3, after the data has been copied to the block, the block offset can be reset to the length of the stored data in the block. In accordance with an embodiment, this block offset can be later used by the system to locate the stored data, so that the requesting application can access the data.

In accordance with an embodiment, the dynamic byte array 170 can store data from database columns of different data types. As an illustrative example, a logical column 311 can store data from a database column of a character type, and the next logical column 312 can store data from a database column of a numeric type.

Figure 4:
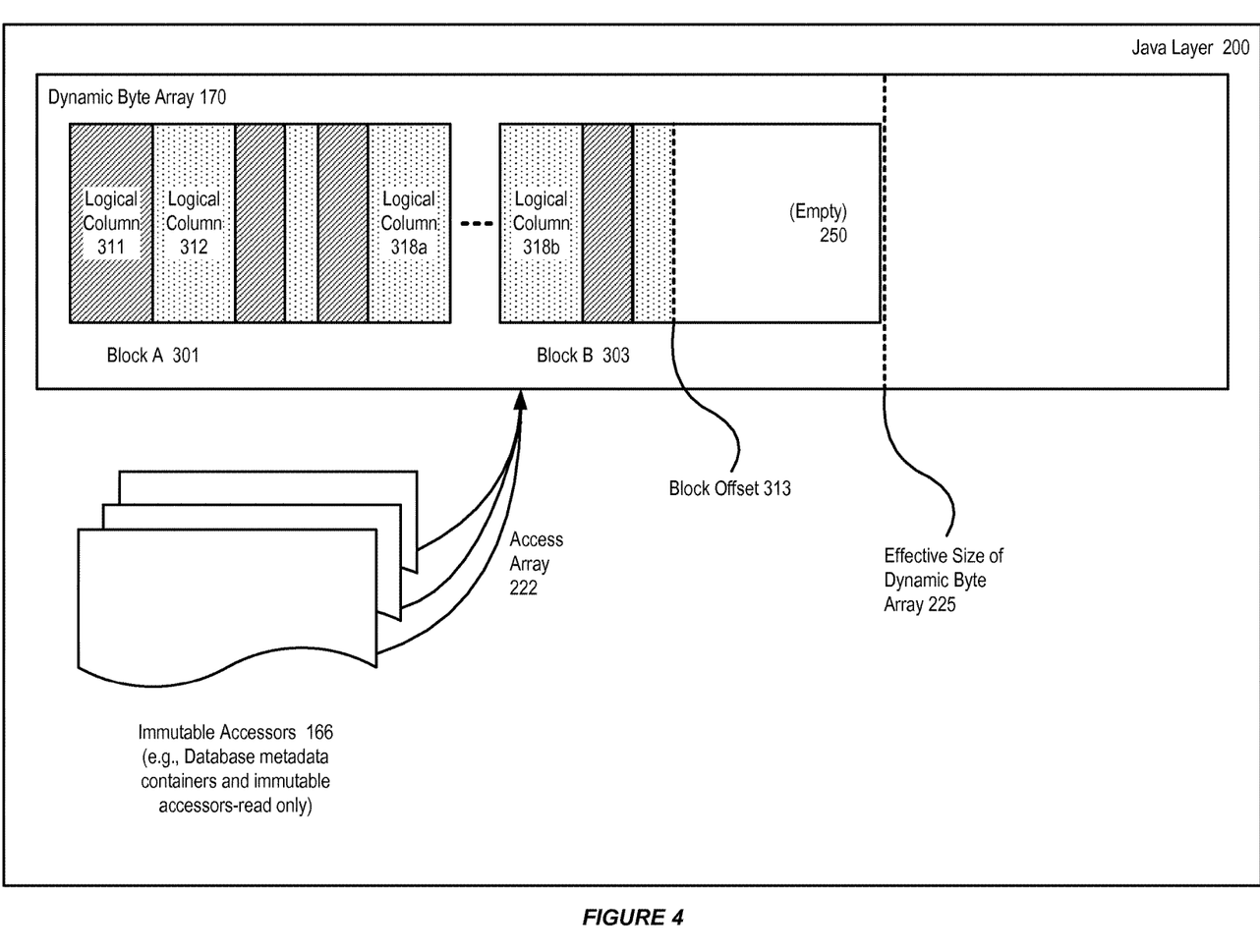
FIG. 4 further illustrates storing of immutable accessors using a linear dynamic byte array, in accordance with an alternative embodiment.

FIG. 4 further illustrates storing of immutable accessors using a linear dynamic byte array, in accordance with an alternative embodiment. In accordance with an embodiment, in some instances the required data may be much larger than the size of a typical block (e.g., 32k). In the above-described scenario, in accordance with an embodiment, the system can first determine the size of the required data, and allocate a single block of memory 301. In accordance with an embodiment, the system can subsequently check the space available (e.g., the available bytes) in the block for storing the required data, and then copy part of the required data equivalent to the size of the block to the block.

In accordance with embodiment, the system can use an offset to track the required data that has been copied, so that the system can remember where to continue copying the required data when space is available in the dynamic byte array 170. In accordance with an embodiment, this offset can be different from the block offset, which is used to track the data stored in a particular block in the pseudo linear dynamic byte array.

As an illustrative example, the offset for tracking the required data can be initially set to zero, and, after data of the size of a block (e.g., 32K) has been copied to the linear dynamic byte array, the offset can be reset to 32K. In accordance with an embodiment, the block offset can also be set to 32k, which indicates that the whole block has been occupied by the required data.

In accordance with an embodiment, the system can then continue to check the bytes available in the linear dynamic byte array 170 to store the remaining required data. If the system detects that the bytes/space available within a current block are not enough to store the remaining required data 318a, 318b, then a new block, e.g. block B 303, can be allocated, and the block offset can be reset accordingly.

The above steps can be repeated until the entire immutable accessor has been completely copied to the linear dynamic byte array 170.

Figure 5:
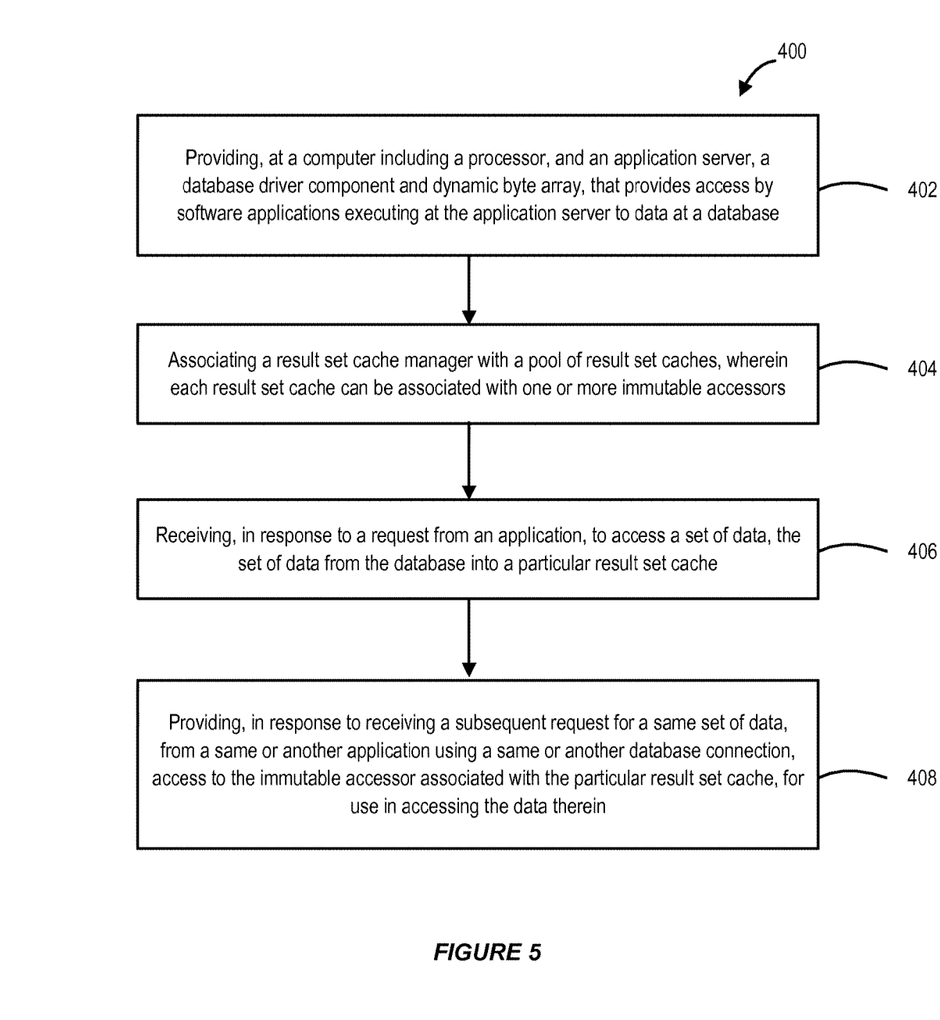
FIG. 5 is a flowchart that illustrates an exemplary method for use of immutable accessors with dynamic byte array.

FIG. 5 is a flowchart that illustrates an exemplary method 400 for use of immutable accessors with dynamic byte array.

At block 402, providing, at a computer including a processor, and an application server, a database driver component and dynamic byte array, that provides access by software applications executing at the application server to data at a database.

At block 404, associating a result set cache manager with a pool of result set caches, wherein each result set cache can be associated with one or more immutable accessors. Each result set cache in the pool can be associated with an array of accessor prototypes internally, which are then used to create immutable accessors that can be shared across multiple connections.

At block 406, receiving, in response to a request from an application, to access a set of data, the set of data from the database into a particular result set cache.

At block 408, providing, in response to receiving a subsequent request for a same set of data, from a same or another application using a same or another database connection, access to the immutable accessor associated with the particular result set cache, for use in accessing the data therein. During operation, an application associated with a first connection can execute a first statement to access a set of data from the database, which can cause an appropriate result set to be cached in its cache. Subsequently, when an application associated with the same or a second connection, in which a second statement is used to access the same set of data (for example, the second statement is the same as the first statement, e.g., a same SQL SELECT statement), the database driver can provide access to the immutable accessor associated with the particular result set cache, for use in accessing the data therein. The same result set and its data therein can then be returned in response to the second statement.

Figure 6:
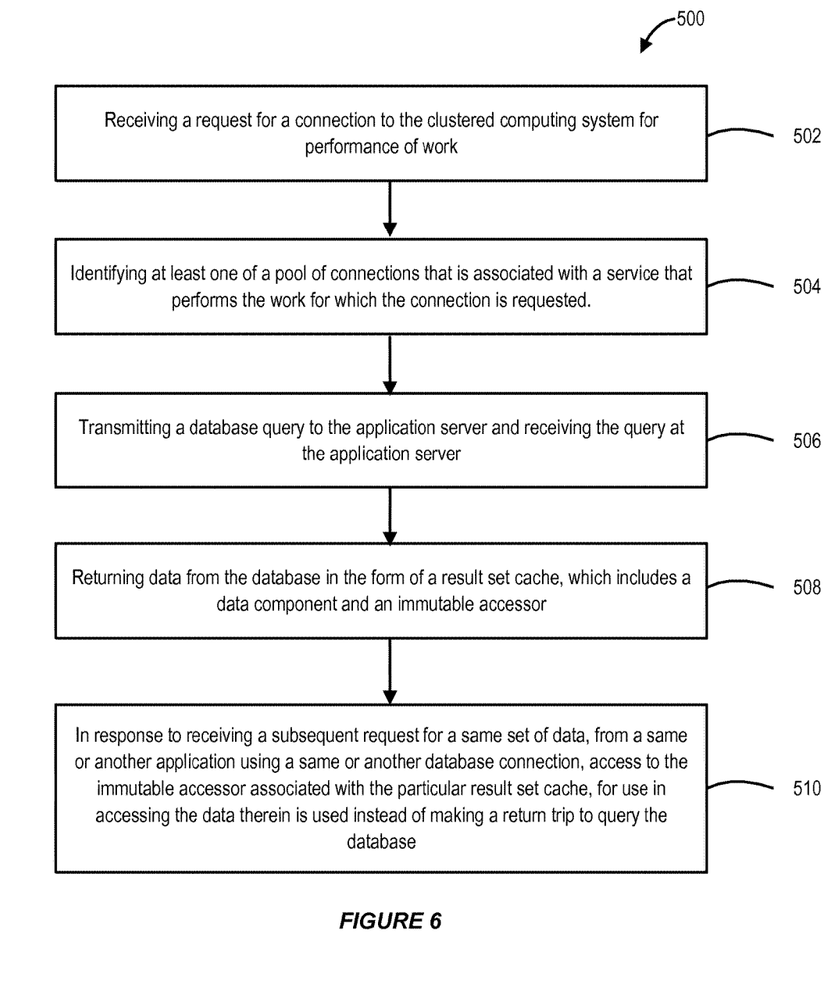
FIG. 6 is a flowchart that illustrates an exemplary method for using immutable accessors with dynamic byte array to access data from a database.

Referring to FIG. 6, an exemplary method 500 is illustrated for using immutable accessors with dynamic byte array to access data from a database.

At block 502, a request is received for a connection to the clustered computing system 100 for performance of work. For example, connection pool manager 114 receives a request from a client through application 120, for a connection to database server 104. The request may be in the form of an explicit request for a connection, a request for work, or any other type of request that would require a session with, and therefore a connection to, the clustered computing system.

At block 504, a pool of connections is identified that is associated with a service that performs the work for which the connection is requested. For example, connection pool logic 132 determines that a particular service performs the requested work and identifies a corresponding connection pool (e.g., connection pool 130), serves connections to the requested service. The service that performs the work may be identified in a number of ways, such as based on the nature of the request or based on information contained in the request that specifies the service. A mapping between services and associated connection pools may be accessed to identify the specific pool that is associated with the identified service.

At block 506, a database query is transmitted to and received by the database 140.

At block 508, data is returned from the database 140 in the form of a result set cache 162, which includes a data component 164 and an immutable accessor 166.

At block 510, in response to receiving a subsequent request for a same set of data, from a same or another application using a same or another database connection, access to the immutable accessor 166 associated with the particular result set cache, for use in accessing the data therein is used instead of making a return trip to query the database 140.

In accordance with various embodiments, the advantages of using immutable accessors with dynamic byte arrays include support for large datasets, and improved performance, particularly when accessing columnar data, or when multiple applications using different connections are interested in requesting same sets of data.

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for use of immutable accessors with dynamic byte arrays, comprising:
    a computer including a processor and a database driver operating thereon comprising a dynamic byte array that provides access by software applications to data at a database; and
    an application server executing on the computer, wherein the application server provides access to a connection pool comprising a plurality of database connections, and operates with the database driver to provide access by the software applications executing at the application server to the database, including:
    receiving a set of data associated with one or more columns from the database, as a result set cache, in response to a first software application executing a first statement using a first database connection from the plurality of database connections, wherein the result set cache includes the set of data and an immutable accessor, wherein the immutable accessor includes a read-only copy of metadata and a pointer to the set of data, and enables access to the set of data by the immutable accessor;
    determining a size of a required data to be stored in memory and allocating one or more data blocks having a particular size in the dynamic byte array;
    copying parts of the data associated with the one or more columns and the result set cache to the dynamic byte array for storage, including successively allocating and copying the required data into the dynamic byte array as a succession of data blocks;
    receiving a request from at least one of the first software application or a second software application for the set of data, wherein the at least one of the first software application or the second software application makes the request by executing a second statement using a second database connection from the plurality of database connections; and
    providing, in response to receiving the request from the at least one of the first software application or the second software application, access by at least one of the first database connection or the second database connection to the immutable accessor associated with the result set cache, and to the set of data stored in the dynamic byte array;
    wherein, when the required data is first returned from a database query, a block offset which specifies the position of a data stored in the block, is initially set to zero, and after the data has been copied to the block, the block offset is reset to the length of the stored data in the block.

2. The system of claim 1, wherein the software applications are Java applications, and wherein the database driver component is a Java Database Connectivity (JDBC) driver.

3. The system of claim 1, wherein the immutable accessor is made available to each of the plurality of database connections in the connection pool, for access by the database connections to the set of data.

4. The system of claim 3, wherein access to the immutable accessor is provided concurrently to each of the plurality of database connections.

5. The system of claim 1, wherein metadata associated with the set of data is used to create the immutable accessor.

6. The system of claim 5, wherein the immutable accessor includes an identification that associates the immutable accessor with a prior statement or connection.

7. The system of claim 1, wherein when space is to be allocated in memory for a required data from the database, a maximum anticipated size of the data expected to be received from the database is ignored, and instead an actual size of the required data is determined and allocated.

8. The system of claim 1, wherein a block offset is used to indicate a position of data in a block, and an effective size of the dynamic byte array provided to keep track of the size of the actual data that has been stored in the dynamic byte array.

9. A method for use of immutable accessors with dynamic byte arrays, comprising:
    providing, at a computer including a processor,
        a database driver comprising a dynamic byte array that provides access by software applications to data at a database, and
        an application server that provides access to a connection pool comprising a plurality of database connections, and operates with the database driver to provide access by the software applications executing at the application server to the database;
    receiving a set of data associated with one or more columns from the database, as a result set cache, in response to a first software application executing a first statement using a first database connection from the plurality of database connections, wherein the result set cache includes the set of data and an immutable accessor, wherein the immutable accessor includes a read-only copy of metadata and a pointer to the set of data, and enables access to the set of data by the immutable accessor;
    determining a size of a required data to be stored in memory and allocating one or more data blocks having a particular size in the dynamic byte array;
    copying parts of the data associated with the one or more columns and the result set cache to the dynamic byte array for storage, including successively allocating and copying the required data into the dynamic byte array as a succession of data blocks;
    receiving a request from at least one of the first software application or a second software application for the set of data, wherein the at least one of the first software application or the second software application makes the request by executing a second statement using a second database connection from the plurality of database connections; and providing, in response to receiving the request from the at least one of the first software application or the second software application, access by at least one of the first database connection or the second database connection to the immutable accessor associated with the result set cache, and to the set of data stored in the dynamic byte array;

wherein, when the required data is first returned from a database query, a block offset which specifies the position of a data stored in the block, is initially set to zero, and after the data has been copied to the block, the block offset is reset to the length of the stored data in the block.

10. The method of claim 9, wherein the software applications are Java applications, and wherein the database driver component is a Java Database Connectivity (JDBC) driver.

11. The method of claim 9, wherein the immutable accessor is made available to each of the plurality of database connections in the connection pool, for access by the database connections to the set of data.

12. The method of claim 11, wherein access to the immutable accessor is provided concurrently to each of the plurality of database connections.

13. The method of claim 9, wherein metadata associated with the set of data is used to create the immutable accessor.

14. The method of claim 13, wherein the immutable accessor includes an identification that associates the immutable accessor with a prior statement or connection.

15. A non-transitory computer readable storage medium, including instructions stored thereon which when read and executed by one or more computers cause the one or more computers to perform the steps comprising:

providing, at a computer including a processor,
a database driver comprising a dynamic byte array that provides access by software applications to data at a database, and
an application server that provides access to a connection pool comprising a plurality of database connections, and operates with the database driver to provide access by the software applications executing at the application server to the database;

receiving a set of data associated with one or more columns from the database, as a result set cache, in response to a first software application executing a first statement using a first database connection from the plurality of database connections, wherein the result set cache includes the set of data and an immutable accessor, wherein the immutable accessor includes a read-only copy of metadata and a pointer to the set of data, and enables access to the set of data by the immutable accessor;

determining a size of a required data to be stored in memory and allocating one or more data blocks having a particular size in the dynamic byte array;

copying parts of the data associated with the one or more columns and the result set cache to the dynamic byte array for storage, including successively allocating and copying the required data into the dynamic byte array as a succession of data blocks;

receiving a request from at least one of the first software application or a second software application for the set of data, wherein the at least one of the first software application or the second software application makes the request by executing a second statement using a second database connection from the plurality of database connections; and providing, in response to receiving the request from the at least one of the first software application or the second software application, access by at least one of the first database connection or the second database connection to the immutable accessor associated with the result set cache, and to the set of data stored in the dynamic byte array;

wherein, when the required data is first returned from a database query, a block offset which specifies the position of a data stored in the block, is initially set to zero, and after the data has been copied to the block, the block offset is reset to the length of the stored data in the block.

16. The non-transitory computer readable storage medium of claim 15, wherein the software applications are Java applications, and wherein the database driver component is a Java Database Connectivity (JDBC) driver.

17. The non-transitory computer readable storage medium of claim 15, wherein the immutable accessor is made available to each of the plurality of database connections in the connection pool, for access by the database connections to the set of data.

18. The method of claim 17, wherein access to the immutable accessor is provided concurrently to each of the plurality of database connections.

19. The non-transitory computer readable storage medium of claim 15, wherein metadata associated with the set of data is used to create the immutable accessor.

* * * * *

UNITED STATES PATENT AND TRADEMARK OFFICE
CERTIFICATE OF CORRECTION

PATENT NO. : 10,776,378 B2
APPLICATION NO. : 14/794642
DATED : September 15, 2020
INVENTOR(S) : Shivarudraiah et al.

Page 1 of 1

It is certified that error appears in the above-identified patent and that said Letters Patent is hereby corrected as shown below:

On the Title Page

Column 1, under Assignee, Line 1, delete "INTERNTIONAL" and insert -- INTERNATIONAL --, therefor.

In the Claims

In Column 12, Line 43, in Claim 18, delete "method" and insert -- non-transitory computer readable storage medium --, therefor.

Signed and Sealed this
Sixth Day of July, 2021

Drew Hirshfeld
*Performing the Functions and Duties of the*
*Under Secretary of Commerce for Intellectual Property and*
*Director of the United States Patent and Trademark Office*